United States Patent Office 3,258,340
Patented June 28, 1966

3,258,340
ARTICLES HAVING A SURFACE OF POLYPROPYLENE COMPRISING ISOTACTIC MACROMOLECULES AND A COATING ADHERED TO SAID SURFACE COMPRISING ATACTIC POLYPROPYLENE; AND METHOD FOR OBTAINING SAID ARTICLES
Ubaldo Riboni, Terni, Italy, assignor to Montecatini Società Generale per l'Industria Mineraria e Chimica, Milan, Italy
No Drawing. Filed July 31, 1957, Ser. No. 675,256
Claims priority, application Italy, Aug. 2, 1956, 11,814/56
23 Claims. (Cl. 96—87)

This invention relates to new and novel photographic films. More particularly, the invention relates to photographic films comprising a synthetic resin support to which the photosensitive layer is anchored by means of one or more intermediate adhesive layers. In its more specific aspects, the invention relates to new photographic films in which at least one of the adhesive layers for anchoring the photosensitive layer to the support comprises relatively low molecular weight, amorphous (atactic), linear head-to-tail polypropylene.

For many years, photographic films have comprised, as the support for the photosensitive layer, a base or support formed from a cellulose derivative.

The disadvantages of the cellulose derivative supports are recognized and are, chiefly, low water-resistance, poor flexibility, and low tenacity. Certain problems have also existed in connection with anchoring of the photosensitive layer to the cellulose derivative support.

An object of this invention is to provide new photographic films which do not have the drawbacks and disadvantages of, and are superior to, the prior art films.

This and other objects are accomplished by the present invention in accordance with which it is found that stretched and stabilized films of linear, head-to-tail, high molecular weight crystalline (isotactic) polymers of propylene have all of the properties of resistance to water, dimensional stability, transparency and flexibility required for a superior support for photographic films.

The photosensitive layer of photographic films generally comprises water-soluble silver halides and a water-sensitive binder therefor, usually gelatine. The photosensitive layer is therefore hydrophillic. One of the problems encountered in the use of a support formed from a synthetic resin or hydrophobic film-forming material is in anchoring the photosensitive layer to the hydrophobic or water-resistant base.

We have found, and this is a specific feature of our invention, that relatively low molecular weight, linear, head-to-tail amorphous (atactic) polymers of propylene are particularly suitable adhesives or components of adhesive compositions for anchoring the photosensitive layer to the isotactic polypropylene or other synthetic resin support.

The films of the invention are multi-layer films in which at least one adhesive layer is interposed between the support and the photosensitive layer, and at least one of the intervening adhesive layers is comprised of the atactic polypropylene.

In preparing the photographic film in accordance with one embodiment of the invention, a stretched and stabilized film of the isotactic, crystalline polypropylene is coated with a solution containing the atactic polypropylene in an appropriate solvent, and the solvent is evaporated to leave an adhesive layer comprising the amorphous polypropylene on the crystalline polypropylene support. Solutions of from 0.1% to 25% by weight, preferably from 5% to 15% of the atactic polypropylene are satisfactory.

The solution coated directly onto the crystalline polypropylene support may contain only the amorphous polypropylene or it may contain a mixture of the amorphous polypropylene with other resins or polymeric materials which are compatible with the amorphous polypropylene. When such mixtures are used the proportions are selected so that the amorphous polypropylene preferably comprises from 5% to 10% of the coating after evaporation of the solvent.

If a mixture of atactic polypropylene and other materials are used, the mixture may be deposited on the support in the form of a thin layer, from mixed solvents.

The film may comprise more than one adhesive layer interposed between the support and the photosensitive layer. Such additional layers may comprise mixtures of atactic polypropylene with other synthetic resins or binding agents, or they may comprise mixtures of synthetic resins or binding agents which do not comprise atactic polypropylene. For instance, the additional layers may comprise mixtures of atactic polypropylene with gelatine, nitrocellulose, or a synthetic resin, or they may comprise, for example, mixtures of gelatine and nitrocellulose.

When more than one adhesive layer is interposed between the support and the photosensitive layer, the successive layers are obtained by coating the previously deposited layer with a solution of the selected adhesive or binding agent or agents and then evaporating the solvent before the next layer is deposited. The solvent or solvents used are preferably selected so that the solvent (or solvents) used in depositing one layer has (have) at least a partial solvating action on the material constituting the previously deposited layer, to insure good reciprocal adhesion of the respective layers, and some commingling thereof for improved homogeneity of the film as a whole.

We find that the atactic polypropylene is always the substance which determines the adhesion of the layers and, also, that the adhesive action thereof is such that if the isotactic polypropylene should snap and fragment, the pieces are bonded together by the atactic polypropylene and the film is not rendered useless as a result of the snapping. For this purpose, it is desirable to mix the atactic polypropylene with another material which facilitates drying of the polypropylene adhesive. Solutions of 10 parts of atactic polypropylene and 5 parts of, for instance, polyvinyl-pyrrolidone in 85 parts of chloroform, are suitable. The addition of the polyvinyl-pyrrolidone is desirable because if the polypropylene is used alone, the two adjacent edges of the snapped isotactic polypropylene film are sealed perfectly but the portions of the film around the seal remain viscous. We find, in addition, that atactic polypropylene is also an excellent adhesive for anchoring the photosensitive layer to supports made of other synthetic resins or film-forming materials such as supports made from polyamides, polyethylene, polyethylene terephthalate, polyvinyl chloride and cellulose acetate. This invention therefore also contemplates new photographic films comprising supports made of film-forming materials other than isotactic polypropylene, such as those mentioned, and comprises at least one adhesive layer at least one of which layers consists of or comprises atactic polypropylene for anchoring the photosensitive layer to the support.

In practice, the adhesive layer comprising amorphous polypropylene and such other layers as may be used, including the gelatine layers, are deposited on the support by any method commonly used in preparing photographic elements, for example, by immersing the film surfaces in a solution of the coating material, by spraying, by thick rim coating or by coating from a hopper provided with a scraper blade.

The thickness of the coating may be varied within a practically wide range, for example, between 1.25 and 25 microns. In general, a thickness of 2.5 to 5.0 microns is most useful.

The photosensitive layer may comprise the usual dispersion of silver salt in gelatine. The photosensitive layer may also be adapted to producing colored images and may consist of a light-sensitive hydrophillic color-yielding composition, such as, for instance, a composition obtained by mixing a soluble silver salt and a soluble halide in a solution of a dye intermediate-substituted alkyl ether of a water-soluble cellulose derivative containing a plurality of free hydroxyl groups.

The following examples are given to illustrate the invention and are not intended as limiting.

Example 1

A film of crystalline polypropylene having an intrinsic viscosity of 1.5 (tetralin at 135° C.) was prepared by extruding the molten polypropylene through a film-forming extruding device of the type used conventionally to form films of thermoplastic materials. The film thus obtained had a thickness of 30 microns. It was stabilized by heating at 120° C. for 4 seconds. A 5% chloroform solution of amorphous polypropylene having an intrinsic viscosity of 0.29 was spread on the crystalline polypropylene film and the chloroform was evaporated. A solution containing 1.2 parts by weight of the amorphous polypropylene, 0.3 part of gelatine, 48 parts of chloroform, 4.5 parts of water, 2 parts of acetic acid and 44 parts of methanol was then spread on the first coating and, after evaporation of the solvents, an aqueous dispersion of silver halides and gelatine was applied. After drying, the photosensitive layer was perfectly anchored.

The film thus obtained had very good stability and water-resistance, excellent flexural strength, high brilliance and clarity.

After exposure and development, the film was projected 600 times without breaking.

The proportion of silver halides and gelatine used is conventional.

Example 2

A film of crystalline polypropylene having an intrinsic viscosity of 1.1 (tetralin at 135° C.) was produced by spreading a 20% solution of the polymer in a petroleum fraction boiling at 190–210° C. uniformly on a rotating drum maintained at 175° C. After 25 minutes in contact with the surface of the drum, during which time evaporation of the solvent occurred, the resulting film was removed from the drum, stretched with a stretching ratio of 1:4 at 135° C., and stabilized for 4 seconds at 130° C. A solution of, by weight, 5 parts of amorphous polypropylene and 5 parts of nitrocellulose in 45 parts of chloroform and 45 parts of acetone was spread on the crystalline polypropylene film and the solvents were evaporated leaving an adhesive layer comprising the amorphous polypropylene and nitrocellulose in contact with the film. A solution containing, by weight, 0.3 part of nitrocellulose, 1.2 part of gelatine, 50 parts of acetone, 3 parts of water, 1.0 part of acetic acid and 44.5 parts of methanol was spread on the polypropylene nitrocellulose layer, and the solvents were evaporated. The photosensitive layer comprising gelatine and silver halide was then applied to obtain a film having a thickness of 35 microns.

The wet and dry adhesion of the photosensitive layer to the support was very good.

Example 3

Films of a crystalline polypropylene having an intrinsic viscosity of 0.9 were prepared. The films had a thickness of 36 microns, a width of 30 mm. and a length of 10 cm. Two of the films were sealed together by spreading a solution of, by weight, 10 parts of amorphous polypropylene and 5 parts of polyvinyl pyrrolidone in 85 parts of chloroform along the breakage edges of the films superimposing one of the films on the other with their edges along which the solution was applied in contact, and pressing the films together.

Good adhesion of the two films was obtained.

Example 4

Polyethylene terephthalate having an intrinsic viscosity of 0.7 was melt-extruded in the usual way to produce a film which after stretching had a thickness of 30 microns. Proceeding as in Example 2, a layer of amorphous polypropylene, a layer of a mixture of amorphous polypropylene and gelatine, and a photosensitive layer of gelatine containing silver halides were successively deposited on the polyethylene terephthalate support.

The resulting photographic film was exposed, developed, washed, fixed, again washed and then dried in the usual way. The adhesion of the photosensitive layer was very good.

The linear regular head-to-tail propylene polymers used in the practice of this invention are new products which have been described recently by G. Natta and his co-workers, Journal of Polymer Science, April 1955, vol. XIV, Issue No. 82, pages 143–154.

The new polymers can be obtained by polymerizing propylene with the aid of catalysts prepared from a compound, such as a halide, of a transition metal of the 4th to 6th groups of the Periodic Table, such as titanium, zirconium, vanadium, etc. and an organometallic compound of a metal of the 1st to 3rd groups of the Periodic Table, such as trialkyl aluminum, the polymerization being carried out in an inert hydrocarbon solvent at temperatures of 50° C. to 120° C. and at atmospheric or only slightly increased pressure.

The crude polymerizate thus obtained comprises a mixture of macromolecules having different steric configurations and which can be separated on the basis of such different configurations by means of selective solvents.

Thus, the crude polymerizate can be extracted successively with hot acetone to remove any oily, low molecular weight polymers, then with ether to separate amorphous polymers made up of non-crystallizable atactic macromolecules, and finally with n-heptane which extracts high molecular weight partially crystalline macromolecules and leaves a residue consisting of highly crystalline polypropylene made up of macromolecules having the stereoregular structure which Natta et al. have called the "isotactic" structure.

According to another modification which is described in the Italian patent No. 526,101, the polymerization of propylene with the aid of the catalysts of the type mentioned can be oriented to the production of polypropylene consisting prevailingly of isotactic macromolecules, or to the production of polypropylene consisting prevailingly of atactic macromolecules, by selection of the specific catalyst used in the polymerization. Thus, if the catalyst used is prepared from a crystalline low-valency compound of, for example, titanium, such as titanium trichloride, and a metal alkyl such as trialkyl aluminum, and is difficultly dispersible in the hydrocarbon solvent used in the polymerization medium, the crude polymerizate consist prevailingly of isotactic macromolecules. On the other hand, if the catalyst is prepared from the metal alkyl and a high-valency titanium or other heavy metal compound, such as titanium tetrachloride, and is soluble or readily dispersible in the inert hydrocarbon solvent, the polymerizate consists prevailingly of atactic macromolecules.

According to Natta et al., isotactic-macromolecules are macromolecules in which, at least for long sections of the main chain, or for substantially the main chain, the tertiary carbon atoms of successive monomeric units have the same steric configuration, and the main chain of the macromolecules, if fully extended in a plane, shows substantially all of the R ($CH_3$—for propylene) groups on one side, e.g., below of the plane and all of the hydrogen atoms bound to the tertiary carbon atoms on the opposite side, e.g., above, of the plane.

The new polymers of the alpha-olefines which have been termed, by Natta, "atactic" polymers consist substantially of macromolecules in which the tertiary asymmetric carbon atoms of the main chain having the same steric configuration have substantially a statistical distribution, and the main chain of which macromolecules, if fully extended in a plane, shows the R (CH$_3$—) groups and the hydrogen atoms bound to the tertiary carbon atoms substantially in random distribution on the two sides of the plane.

The crystalline polypropylene used as base or support for the photographic films of this invention may be the product remaining after extraction of the oily, amorphous and partially crystalline polymers from the crude polymerizate, or it may be produced directly.

In some instances the residue of the ether extraction may be used to form the support for the film, provided the amount of amorphous polypropylene contained therein does not exceed about 30%.

The amorphous polypropylene used as adhesive for anchoring the photosensitive layer to the base either directly or through suitable intermediate layers may be the portion of the crude polymerizate extractable with ether, or it may be obtained directly by selection of the catalyst as described hereinabove.

In general, the crystalline polypropylene used in making the support has an intrinsic viscosity, measured in tetralin at 135° C., between 0.3 and 2, and the amorphous polypropylene has an intrinsic viscosity, in tetralin at 135° C. between 0.2 and 0.4.

Since various changes and modifications may be made in practicing the invention without departing therefrom, it is intended to include all such variations as may be apparent to those skilled in the art in the scope of the appended claims.

What is claimed is:

1. As a new article of manufacture, a photographic film which comprises a support formed of a stretched and heat-stabilized film of a polypropylene consisting prevailingly of isotactic macromolecules, an adhesive layer of atactic polypropylene having an intrinsic viscosity of from about 0.2 to about 0.4, measured in tetralin at 135° C. on the support, an adhesive layer of a mixture of the atactic polypropylene and gelatine on the atactic polypropylene layer, and a top photosensitive silver halide layer, the photosensitive layer being permanently anchored to the support by the intervening adhesive layers.

2. As a new article of manufacture, a photographic film which comprises a support formed of a stretched and heat-stabilized film of a polypropylene consisting prevailingly of isotactic macromolecules, an adhesive layer of a mixture of atactic polypropylene having an intrinsic viscosity of from about 0.2 to about 0.4, measured in tetralin at 135° C. and nitrocellu'ose on the support, a layer of a mixture of the atactic polypropylene and gelatine on the atactic polypropylene-nitrocellulose layer, and a top photosensitive silver halide layer, the photosensitive layer being permanently anchored to the support by the intervening adhesive layers.

3. As a new article of manufacture, a photographic film which comprises a support formed of a film of polyethylene terephthalate, an adhesive layer of atactic polypropylene having an intrinsic viscosity of from about 0.2 to about 0.4, measured in tetralin at 135° C. on the support, a layer of a mixture of the atactic polypropylene and gelatine on the atactic polypropylene layer, and a top photosensitive silver halide layer, the photosensitive layer being permanently anchored to the support by the intervening adhesive layers.

4. The method of making a photographic film which comprises depositing, on a support consisting of a film made of a film-forming material selected from the group consisting of polypropylene consisting prevailingly of isotactic macromolecules, polyamide, polyethylene, polyethylene terephthalate, polyvinyl chloride and cellulose acetate, at least one adhesive layer, at least one such adhesive layer being obtained by depositing directly on a surface of the support a solution of about 5% by weight of atactic polypropylene having an intrinsic viscosity of from about 0.2 to about 0.4, measured in tetralin at 135° C. and about 5% by weight of nitrocellulose in a mixture of chloroform and acetone and evaporating the solvents, and then depositing an aqueous dispersion of gelatine and silver halides on the adhesive layer and evaporating the water, whereby the photosensitive layer thus obtained is permanently anchored to the support by the intervening adhesive layer.

5. The method of making photographic films which comprises coating a support consisting of a stretched and heat-stabilized film of polypropylene consisting prevailingly of isotactic macromolecules with a solution of atactic polypropylene having an intrinsic viscosity of from about 0.2 to about 0.4, measured in tetralin at 135° C., evaporating the solvent, coating the adhesive layer of atactic polypropylene thus obtained with a solution of a mixture of the atactic polypropylene and gelatine, evaporating the solvent, coating the adhesive atactic polypropylene-gelatine layer thus obtained with an aqueous dispersion of gelatine and silver halides, and evaporating the solvent, whereby the photosensitive layer thus obtained is permanently anchored to the support by the intervening adhesive layers.

6. The method of making photographic films which comprises coating a support consisting of a stretched and heat-stabilized film of polypropylene consisting prevailingly of isotactic macromolecules with a solution of a mixture of atactic polypropylene having an intrinsic viscosity of from about 0.2 to about 0.4, measured in tetralin at 135° C., and nitrocellulose, evaporating the solvent, coating the adhesive atactic polypropylene nitrocellulose layer thus obtained with a solution of a mixture of nitrocellulose and gelatine, evaporating the solvent, coating the adhesive nitrocellulose gelatine layer thus obtained with an aqueous dispersion of gelatine and silver halides, and evaporating the water, whereby the photosensitive layer thus obtained is permanently anchored to the support by the intervening adhesive layers.

7. The method of making photographic films which comprises coating a support consisting of a film of polyethylene terephthalate with a solution of atactic polypropylene having an intrinsic viscosity of from about 0.2 to about 0.4, measured in tetralin at 135° C., evaporating the solvent, coating the adhesive layer of atactic polypropylene thus obtained with a solution of a mixture of the atactic polypropylene and gelatine, evaporating the solvent, coating the adhesive atactic polypropylene gelatine layer thus obtained with an aqueous dispersion of gelatine and silver halides, and evaporating the water, whereby the photosensitive layer thus obtained is permanently anchored to the support by the intervening adhesive layers.

8. As a new article of manufacture, a photographic film comprising a photosensitive silver halide layer and a support therefor consisting of a film made of a film-forming material selected from the group consisting of polypropylene consisting prevailingly of isotactic macromolecules, polyamide, polyethylene, polyethylene terephthalate, polyvinyl chloride and cellulose acetate, the photosensitive silver halide layer being permanently anchored to the support by at least one intermediate adhesive layer, and at least the intermediate layer disposed directly on the surface of the support comprising atactic polypropylene having an intrinsic viscosity of from about 0.2 to about 0.4 measured in tetralin at 135° C.

9. As a new article of manufacture, a photographic film comprising a photosensitive silver halide layer and a support therefor formed of a stretched, heat-stabilized film of polypropylene consisting prevailingly of isotactic macromolecules, the photosensitive silver halide layer being permanently anchored to the support by at least one intermediate adhesive layer, and at least the intermediate adhesive layer disposed directly on the surface of the support comprising atactic polypropylene having an intrinsic viscosity of from about 0.2 to about 0.4 measured in tetralin at 135° C.

10. As a new article of manufacture, a photographic film comprising a photosensitive silver halide layer and a support therefor consisting of a stretched, stable film of polyethylene terephthalate, the photosensitive silver halide layer being permanently anchored to the support by at least one intermediate adhesive layer, and at least the intermediate adhesive layer disposed directly on the surface of the support comprising atactic polyypropylene having an intrinsic viscosity of from about 0.2 to about 0.4 measured in tetralin at 135° C.

11. As a new article of manufacture, a photographic film comprising a photosensitive silver halide layer and a support therefor consisting of a film made of a film-forming material selected from the group consisting of polypropylene consisting prevailingly of isotactic macromolecules, polyamide, polyethylene, polyethylene terephthalate, polyvinyl chloride, and cellulose acetate, the photosensitive silver halide layer being permanently anchored to the support by at least one intermediate adhesive layer, and at least the intermediate adhesive layer disposed directly on the surface of the support consisting of atactic polypropylene having an intrinsic viscosity of from about 0.2 to about 0.4 measured in tetralin at 135° C.

12. As a new article of manufacture, a photographic film comprising a photosensitive silver halide layer and a support therefor consisting of a film made of a film-forming material selected from the group consisting of polypropylene consisting prevailingly of isotactic macromolecules, polyamide, polyethylene, polyethylene terephthalate, polyvinyl chloride and cellulose acetate, the photosensitive silver halide layer being permanently anchored to the support by at least one intermediate adhesive layer and at least the intermediate adhesive layer disposed directly on the surface of the support consisting of a mixture of nitrocellulose and an atactic polypropylene which has an intrinsic viscosity of from about 0.2 to about 0.4 measured in tetralin at 135° C.

13. As a new article of manufacture, a photographic film comprising a photosensitive silver halide layer and a support therefor consisting of a film made of a film-forming material selected from the group consisting of polypropylene consisting prevailingly of isotactic macromolecules, polyamide, polyethylene, polyethylene terephthalate, polyvinyl chloride and cellulose acetate, the photosensitive silver halide layer being permanently anchored to the support by at least one intermediate adhesive layer and at least the intermediate adhesive layer disposed directly on the surface of the support consisting of a mixture of gelatine and an atactic polypropylene which has an intrinsic viscosity of from about 0.2 to about 0.4 measured in tetralin at 135° C.

14. The method of making a photographic film which comprises depositing, on a support consisting of a film made of a film-forming material selected from the group consisting of polypropylene consisting prevailingly of isotactic macromolecules, polyamide, polyethylene, polyethylene terephthalate, polyvinyl chloride and cellulose acetate, at least one adhesive layer, at least one such adhesive layer being obtained by depositing directly on a surface of the support a solution comprising atactic polypropylene having an intrinsic viscosity of from about 0.2 to about 0.4 measured in tetralin at 135° C. and evaporating the solvent, and finally depositing an aqueous dispersion of gelatine and silver halides on the adhesive layer and evaporating the water, whereby the photosensitive layer thus obtained is permanently anchored to the support by the intermediate adhesive layer.

15. The method according to claim 14, characterized in that at least one adhesive layer is obtained by depositing directly on a surface of the support a solution of from 0.1% to 25% by weight of the atactic polypropylene.

16. The method according to claim 15, characterized in that the solvent for the atactic polypropylene is chloroform.

17. The method according to claim 14, characterized in that at least one adhesive layer is obtained by depositing directly on a surface of the support a solution of from 5% to 15% by weight of the atactic polypropylene.

18. The method according to claim 17, characterized in that the solvent for the atactic polypropylene is chloroform.

19. In a process for the production of an adherent coating on a polymeric surface prepared from a polymer selected from the group consisting of polyethylene and polypropylene consisting prevailing by of isotactic macromolecules, the steps of applying a solution of an atactic polymer of propylene as a binding agent to said surface and subsequently solidifying said solution on said surface.

20. Process of claim 19 wherein the binding agent is dissolved in a chlorinated organic solvent.

21. Process of claim 19 wherein the binding agent is an atactic polypropylene.

22. A strong polyolefin article resistant to environmental stress cracking comprising a base of crystalline polypropylene consisting prevailing of isotactic macromolecules and a layer of amorphous polypropylene integrally bonded to said base, said amorphous layer preventing access to the underlying crystalline base.

23. A polyolefin article as defined in claim 22, wherein said base comprises a sheet of crystalline polypropylene consisting prevailingly of isotactic macromolecules protected on at least one surface with said layer of amorphous polypropylene.

References Cited by the Examiner

UNITED STATES PATENTS

| | | | |
|---|---|---|---|
| 2,773,769 | 12/1956 | Goldschein | 96—87 X |
| 2,816,027 | 12/1957 | Farrell et al. | 96—87 |

FOREIGN PATENTS 538,782  12/1955  Belgium.

OTHER REFERENCES

Hill et al.: "Polymer Constitution and Fiber Properties," J. Poly. Sci., volume 3, No. 5, 1948, pp. 609–630.

WILLIAM D. MARTIN, *Primary Examiner.*

PHILIP E. MANGAN, MILTON STERMAN, RICHARD D. NEVIUS, *Examiners.*

J. L. SPROULL, MURRAY KATZ, *Assistant Examiners.*